(12) United States Patent
Blanchard et al.

(10) Patent No.: US 9,414,026 B2
(45) Date of Patent: Aug. 9, 2016

(54) SYSTEM AND METHOD FOR AUTOMATED CRACK INSPECTION AND REPAIR

(71) Applicant: The Boeing Company, Chicago, IL (US)

(72) Inventors: Steven D. Blanchard, Issaquah, WA (US); Gary E. Georgeson, Tacoma, WA (US); Joseph L. Hafenrichter, Seattle, WA (US); Karl E. Nelson, Shoreline, WA (US); Thomas T. McCleave, Mill Creek, WA (US)

(73) Assignee: THE BOEING COMPANY, Chicago, IL (US)

( * ) Notice: Subject to any disclaimer, the term of this patent is extended or adjusted under 35 U.S.C. 154(b) by 587 days.

(21) Appl. No.: 13/749,843

(22) Filed: Jan. 25, 2013

(65) Prior Publication Data

US 2014/0210997 A1    Jul. 31, 2014

(51) Int. Cl.
*H04N 7/18* (2006.01)
*G01M 5/00* (2006.01)
*G01M 11/02* (2006.01)

(52) U.S. Cl.
CPC .................. *H04N 7/18* (2013.01); *G01M 5/005* (2013.01); *G01M 5/0016* (2013.01); *G01M 5/0033* (2013.01); *G01M 5/0075* (2013.01); *G01M 5/0091* (2013.01); *G01M 11/0278* (2013.01)

(58) Field of Classification Search
CPC ............ G01M 5/0016; G01M 5/0033; G01M 11/0278
USPC ........... 348/92, 125, 128, 135; 73/583, 865.8; 356/237.3, 237.2
See application file for complete search history.

(56) References Cited

U.S. PATENT DOCUMENTS

| 5,473,953 | A  | 12/1995 | Appel |
| 6,003,377 | A  | 12/1999 | Waag et al. |
| 7,643,893 | B2 | 1/2010  | Troy et al. |
| 7,859,655 | B2 | 12/2010 | Troy et al. |

(Continued)

FOREIGN PATENT DOCUMENTS

| CN | 1756250 | 4/2006 |
| EP | 1744156 | 1/2007 |
| EP | 2345881 | 7/2011 |
| GB | 2057697 | 4/1981 |
| GB | 2491978 | 12/2012 |

OTHER PUBLICATIONS

EP, Search Report and Opinion, European Application No. 14150259.1 (Apr. 28, 2014).

(Continued)

*Primary Examiner* — Brian Yenke
*Assistant Examiner* — Jean W Desir
(74) *Attorney, Agent, or Firm* — Thompson Hine LLP

(57) ABSTRACT

A system for automated inspection of a surface; the system may include a self-propelled, steerable carriage capable of traversing the surface, the carriage having a camera positioned to view an object on the surface, and at least of one of a sensor capable of detecting a defect in the surface, a tool for treating the defect, and a sensor for inspecting a repair of the defect; and a computer controller connected to receive image data from the camera, communicate with and selectively actuate the at least of one of a sensor capable of detecting a defect in the surface, a tool for treating the defect, and a sensor for inspecting a repair of the defect, and control the carriage to move on the surface along one or more of a pre-set path and a path to one or more pre-set locations.

22 Claims, 2 Drawing Sheets

(56) References Cited

U.S. PATENT DOCUMENTS

| | | |
|---|---|---|
| 8,044,991 B2 | 10/2011 | Lea et al. |
| 8,198,617 B2 | 6/2012 | Georgeson et al. |
| 8,249,832 B2 | 8/2012 | Motzer et al. |
| 8,279,412 B2 | 10/2012 | Motzer et al. |
| 9,031,734 B2 * | 5/2015 | Froom .................. 701/29.3 |
| 2003/0048081 A1 | 3/2003 | Seemann |
| 2003/0089183 A1 | 5/2003 | Jacobsen et al. |
| 2005/0027826 A1 | 2/2005 | Loda et al. |
| 2009/0086014 A1 | 4/2009 | Lea et al. |
| 2010/0153051 A1 | 6/2010 | Georgeson et al. |
| 2011/0149266 A1 | 6/2011 | Motzer |
| 2012/0221625 A1 | 8/2012 | Lea et al. |
| 2012/0320372 A1 | 12/2012 | Troy et al. |
| 2013/0018525 A1 | 1/2013 | Jang et al. |
| 2013/0024067 A1 | 1/2013 | Troy et al. |

OTHER PUBLICATIONS

Doyle, P.A. et al., "Crack depth measurement by ultrasonics: a review," *Ultrasonics*, vol. 16, No. 4, pp. 164-170 (Jul. 1978).

Communication pursuant to Article 94(3) EPC, European Application No. 14150259.1; (Feb. 27, 2015); European Patent Office; Rijswijk, Netherlands.

CN, Notification of First Office Action with English translation; Patent Application No. 201410035159.7 (Jul. 20, 2015).

CA, Office Action, Patent Application No. 2,829,888 (Nov. 16, 2015).

CN, Notification of Second Office Action (with English translation), Chinese Application No. 201410035159.7, Mar. 10, 2016.

* cited by examiner

SYSTEM AND METHOD FOR AUTOMATED CRACK INSPECTION AND REPAIR

FIELD

The disclosed system and method relate to inspection and repair of surface defects and, more particularly, to systems and methods for automated inspection and repair of cracks formed in a surface.

BACKGROUND

Inspection and repair of defects in a surface is often a costly and time-consuming procedure. For example, a single aircraft wing may include thousands of fasteners embedded in a carbon fiber panel. Each of the fasteners may be covered with a dielectric top to prevent lightning strikes from entering the fuel tank area. Each of the dielectric tops may be covered with a layer of paint.

Current inspection and repair is a completely manual operation. It is necessary to visually inspect each dielectric top to determine whether it is cracked. Cracks that are greater than 0.1 inches in length may require repair or replacement of the dielectric top. Once it is determined that a cracked dielectric top must be repaired, is necessary to manually remove the top, clean and prepare the exposed fastener surface, apply fresh dielectric material, and paint the material when hardened.

Such manual operations are time-consuming and costly. The completely manual nature of the operation may result in repair quality issues. The large amount of time required to inspect and repair dielectric tops on an aircraft in this manner may result in an aircraft being out of service for extended periods of time.

Accordingly, there is a need for a system and method for automating the inspection and repair of defects in a surface. Further, there is a need for automating the process of detection and repair of cracks and dielectric tops on the surfaces of aircraft wings.

SUMMARY

In an embodiment, a system for automated inspection of a surface may include a self-propelled, steerable carriage capable of traversing the surface, the carriage having a camera positioned to view an object on the surface, and at least one of a sensor capable of detecting a defect in the surface, a tool for treating the defect, and a sensor for inspecting a repair of the defect; and a computer controller connected to receive image data from the camera, communicate with and selectively actuate at least one of the sensor and the tool, and control the carriage to move on the surface along one or more of a pre-set path and a path to one or more pre-set locations.

In another embodiment, a system for automated inspection of a wing surface of an aircraft may include a self-propelled, steerable carriage capable of traversing the wing surface, the carriage having a camera positioned to view an object on the wing surface, and at least one of a sensor capable of detecting a defect in the wing surface, a tool for treating the defect, and a sensor for inspecting a repair of the defect; and a computer controller connected to receive image data from the camera, communicate with and selectively actuate at least one of the sensor capable of detecting a defect in the wing surface, the tool for treating the defect and the sensor for inspecting a repair of the defect, and control the carriage to move on the wing surface along one or more of a pre-set path and a path to one or more pre-set locations.

In yet another embodiment, a method for automated inspection of a surface includes placing a self-propelled, steerable carriage on the surface, the carriage having a camera positioned to view an object on the surface, and at least one of a sensor capable of detecting a defect in the surface, a tool for treating the defect, and a sensor for inspecting a repair of the defect; receiving image data from the camera; and communicating with and selectively actuating the at least one of the sensor capable of detecting the defect in the surface, the tool for treating the defect, and the sensor for inspecting a repair of the defect, and controlling the carriage to move on the surface along one or more of a pre-set path and a path to one or more pre-set locations.

Other objects and advantages of the disclosed method and system will be apparent from the following description, the accompanying drawings and the appended claims.

DETAILED DESCRIPTION

Figure 1:
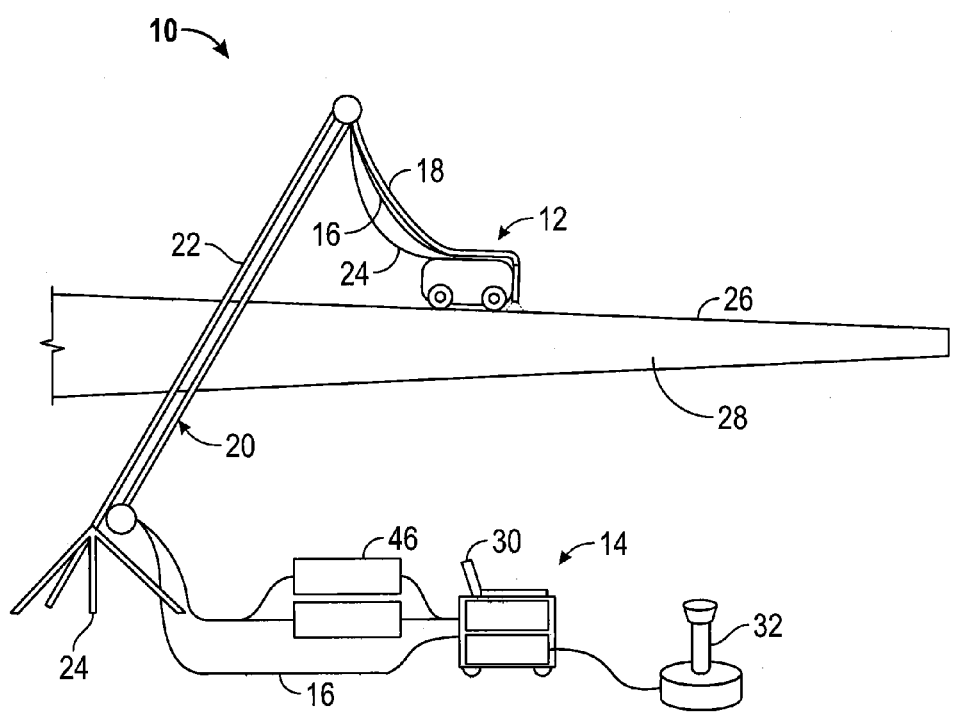
FIG. 1 is a somewhat schematic, side elevation of the described system for automated crack inspection and repair.

As shown in FIG. 1, the system for automated crack inspection and repair, generally designated 10, may include a carriage, generally designated 12, that is in communication with a computer controller, generally designated 14. The carriage 12 may communicate with the computer controller 14 by wireless communication, such as using the Bluetooth communication protocol, or as shown, using a data communication cable 16 that extends between the computer controller and the carriage. A power cable 18 also may extend between and link the carriage 12 with the computer controller 14.

The system 10 may also include a boom or tether rod 20. The tether rod 20 may consist of an elongate shaft 22 made of a rigid material, such as polyvinyl chloride (PVC) or fiberglass, and may include a stand 24 that rests upon the ground. The tether rod 20 also may convey and support the cables 16, 18 that interconnect the carriage 12 with the computer control 14, and may include a support cable 24 for fall arrest; namely, to protect the carriage 12 in the event it inadvertently falls from a surface.

As shown in FIG. 1, the carriage 12 may be placed upon a surface, which in an embodiment may be the upper surface 26 of an aircraft wing 28. The upper surface 26 may be oriented substantially horizontally, so that the carriage may be guided by the computer control 14 in a pre-set, horizontal path along the upper surface.

The computer control 14 may include a visual display 30, and optionally may include a carriage steering device or controller 32 for manual guidance of the carriage 12.

Figure 2:
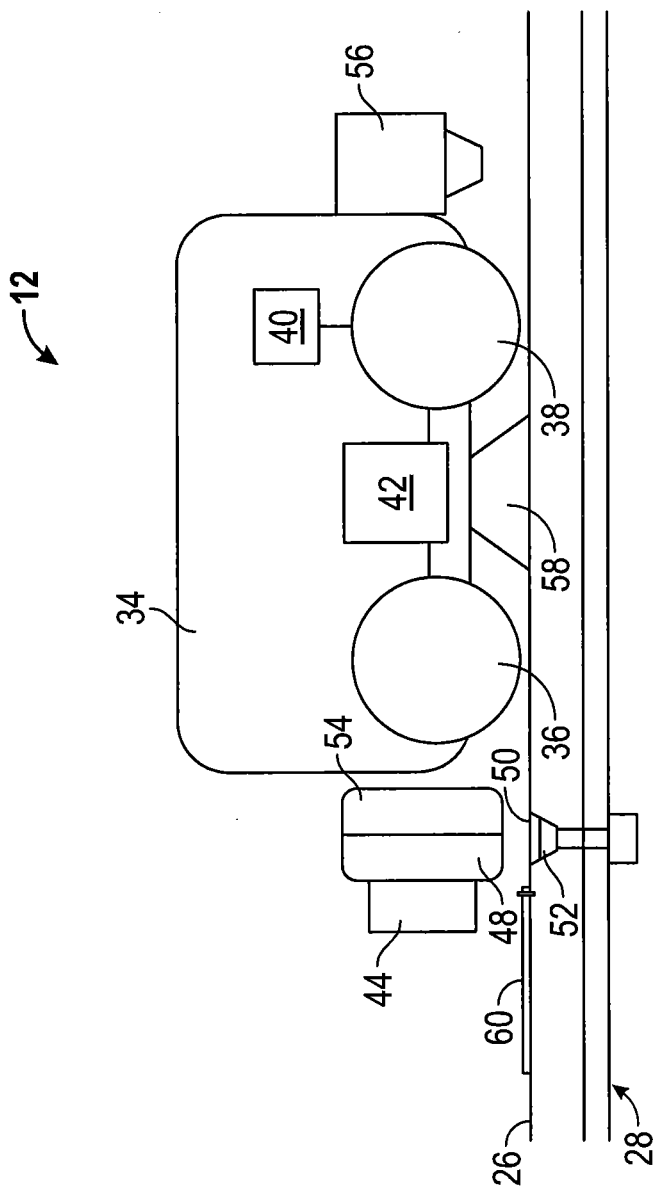
FIG. 2 is a detail showing the carriage of the system shown in FIG. 1.

As shown in FIG. 2, the carriage 12 may be a self-propelled, steerable carriage that includes a chassis, generally designated 34, that may include wheel pairs 36, 38 (four wheels in all) of which wheel pair 36 and/or wheel pair 38 may be steerable by powered steering linkage 40 actuated by computer control 14. Wheels pairs 36, 38 may be driven by an onboard electric motor or motors 42, and may include friction material to prevent slippage on surface 26. The powered steering linkage 40 and motors 42 may be actuated, powered and controlled by the computer control 14 (FIG. 1) through the cables 16, 18.

The carriage 12 also may include a high-resolution camera 44 mounted on the chassis 34. The high-resolution camera 44 may be connected to the computer controller 14 through cable 16 (FIG. 1) and may be configured so view and transmit a high resolution-image of the surface 26, and objects on the surface, which in embodiments may include surface features, markings on or embedded in the surface, or dielectric tops covering fasteners, to the computer control 14 and shown on display 30. Further, computer control 14 may include data storage 46 containing image analysis software for processing images of the surface 26 and objects on the surface transmitted from the camera 44. In embodiments, the camera 44 may be fixed relative to chassis 34, or be mounted for pivotal movement relative thereto, the pivotal movement being remotely actuated by computer controller 14 or manually through computer controller 32.

In embodiments, data storage 46 may include one or more pre-set paths and/or a table of one or more pre-set locations, which in embodiments may be inspection and/or repair paths and inspection and/or repair locations, identified on a specified surface 26 of a particular model aircraft. Thus, the computer control may actuate the carriage to travel on the surface 26 along one or more of a pre-set path and a path to one or more pre-set locations on the surface.

The carriage 12 also may include a sensor capable of detecting a defect in the surface 26, which in an embodiment may be crack depth sensor 48 mounted on the chassis 34 and connected to the computer control 14 by cable 16, or wirelessly. The crack depth sensor 48 may include instrumentation for finding a defect in the surface 26, which in an embodiment may include a crack in a top 50 made of dielectric material that covers a fastener 52 in the aircraft wing 28. The sensor 48 may include high-resolution optical imaging with alternating light emitting diode (LED) side-lighting to show up a crack in a dielectric top 50 in any orientation. In other embodiments, the sensor 48 may include a dye penetrant drop-and-wipe device that utilizes ultraviolet light to detect a crack, in which the sensor 48 may include an ultraviolet lamp configured to direct ultraviolet light on the dielectric top and imaging is made of the lighted area using paint with chromatic dyes deposited on the area by the sensor 48. In other embodiments, the sensor 48 may utilize ultraviolet or infrared laser fluorescence, by fluorescing materials in the dielectric top, or by using Raman spectroscopy, or by other known methods and devices.

In an embodiment, the carriage 12 may include a crack depth measurement sensor 54, mounted on the chassis 34 and connected to the computer control 14 by cable 16, or wirelessly. Crack depth measurement sensor 54 may be employed to measure the depth of a crack detected in the dielectric top 50. The crack depth measurement sensor 54 may include a terahertz measurement device that transmits terahertz radiation upon the dielectric top 50 to measure and/or image the depth of a crack in the dielectric top. In other embodiments, the crack depth measurement sensor 54 may include a narrow beam laser that is scanned over the crack in the dielectric top 50, and the time-of-flight difference between the surface and the bottom of the crack may be measured to determine the depth of the crack. In another embodiment, the crack depth measurement sensor 54 may include a forced diffusion thermography device that measures the amount of heat transferred from one side of the crack in the dielectric top 50 to the other, and include a localized heat source applied to one side of the crack and the dielectric top is imaged with a mini uncooled infrared camera included in the crack depth measurement sensor 54.

In still other embodiments, the crack depth measurement sensor 54 may utilize a high frequency ultrasound generator. The ultrasound projector may direct an angled pitch-catch across the crack or structural wave across the crack. In other embodiments, the crack depth measurement sensor 54 may include a fiber optic laser ultrasound generator. In other embodiments, the crack depth measurement sensor 54 may include one or more of capacitance measurement across the crack in the dielectric top 50, a near-field millimeter wave generator, a mini x-ray backscatter device, a Fourier transform infrared (FTIR) generator, Raman spectroscopy utilizing a laser, and/or laser fluorescence (fluorescing at 792 nm). If the crack in the dielectric top 50 exceeds a predetermined depth, the dielectric top 50 either may be marked for later repair or may be repaired by a tool for treating the defect, such as a device 56 mounted on the carriage chassis 34.

In an embodiment, the chassis 34 may include a tool for treating a defect in the surface 26, which in an embodiment may include device 56, actuated and powered by computer controller 14, to mark cracked dielectric tops for subsequent repair or removal. In an embodiment, the device 56 may include a pen marker using an actuator to mark the dielectric top 50 with ink. In other embodiments, the device 56 may include a dispenser that dispenses stickers or appliqué, and in other embodiments, the device 56 may include a digital marker that transmits a signal through the cable 16 to the computer control 14 (FIG. 1) that records the location (either by an assigned number or by coordinates) of the cracked dielectric top 50 on the wing 28 on a database 46. The digital marker may include local positioning system (LPS) software or motion capture software to determine the location of the dielectric top 50.

In other embodiments, the tool for treating a defect in the surface 26 may include device 56 being adapted to function as a dielectric top repair device, actuated and powered by computer controller 14. In such embodiments, the device 56 may include a device for removing a dielectric top, which may include a dielectric material remover that may be in the form of a plastic router powered through cable 18 from the computer controller 14. In other embodiments, the device 56 may consist of or include a dispenser of acetone or methyl ethyl ketone (MEK) and chemical auto-wipe with a green residue recovery system. Such a dispenser would prepare the surface beneath the cracked dielectric top 50 (i.e., the top surface of the fastener 52) for application of a replacement dielectric top.

In embodiments, the device 56 may include a dispenser that deposits dielectric material over the fastener 52 and/or applies paint over the reapplied dielectric material. In yet other embodiments, the device 56 may apply an appliqué over the dielectric material 50 instead of paint. The dielectric material dispenser and appliqué dispenser 56 also may be connected to be actuated and powered by computer controller 14.

In such embodiments in which device 56 may include a dielectric top repair device, the carriage 12 may be configured such that one of the sensors 48, 54 may be a sensor for inspecting a repair of a defect in the surface 26, which in an embodiment may include a sensor for verifying the integrity of a repair made by device 56. In such embodiments, sensor 54, for example, may be a thermal imaging camera that utilizes infra-red thermography (IRT) to detect internal voids in the replacement dielectric top 50 applied to the fastener 52. In other embodiments, sensor 48 may be a microwave or ultrasonic thickness gauge to measure the thickness of paint applied to the top of the fastener 52. In such embodiments, optical imaging with the high-resolution camera 44 may verify full coverage of the dielectric.

In other embodiments, an electromagnetic method may be used, such as a capacitive method for checking the material filler capacitance, or eddy current to check for the mesh around the edge of the fastener 52. In such an embodiment, sensor 48 may be a magneto-optical imaging device, which may be used as a full-field imaging method of the surrounding mesh (like eddy current but providing a 2-D image), or the sensor 48, 54 may be an eddy current array.

In embodiments, the carriage 12 may include a stability mount 58 that is selectively actuated by the computer controller 14 (FIG. 1). The stability mount 58 may, in some embodiments, include a suction device in the form of one or more suction cups to provide a vacuum assist for stabilizing and fixing the carriage 12 during an inspection or repair operation. The stability mount 58 may be powered by and selectively activated by computer controller 14.

In embodiments, the system 10 may include one or more than one carriage 12. In embodiments comprising multiple carriages 12, each carriage may be configured to perform a different function, such as a different one of inspection, marking, repair and repair inspection. In embodiments comprising multiple carriages 12, the computer controller 14 may operate carriages 12 in conjunction with each other, in which, for example, a first carriage 12 performs crack detection, and a second carriage performs crack marking and/or repair. In other embodiments, the second carriage 12 may be operated by the computer controller 14 to operate independently of the first carriage 12, in which, for example, both first and second carriages 12 may perform the same aforementioned function or functions, or different ones of the aforementioned functions.

In embodiments, the system 10 may be configured such that the computer control 14 guides the carriage 12 over a pre-set pattern of locations from one fastener 52 to another fastener on the aircraft wing 28, in which the computer controller guides the carriage 12 along a path from one pre-set location of a fastener 52 on the wing to another pre-set location of a fastener 52. Data comprising path and fastener locations for the wing 28 of a particular aircraft may be stored in storage 46 as part of computer controller 14, or called by computer controller from a remote location over a network (not shown). In other embodiments, the carriage 12 may follow a copper foil grid 60 mounted on or embedded in the surface 26 of the aircraft wing 28 that interconnects the fasteners 52. In embodiments, the carriage 34 may be guided to one or more pre-set locations (i.e., from one fastener location to another) manually by a user using controller 32, entirely by the computer control 14, or a combination of both manually and by computer control.

The operation of the system 10 for automated crack inspection and repair is as follows. The carriage 12 may be placed upon the surface 26 of an aircraft wing 28, either manually or by a robot arm (not shown). In embodiments, the carriage 12 may be placed upon other surfaces of an aircraft or other vehicle. One or more of the specific type of aircraft wing 28, the pattern of fasteners 50 on that wing and the path to be traveled by the carriage 12 may be stored locally in database 46 of computer control 14 or accessed from a remote location. The carriage 12 initially may be guided by a user using controller 32 to an initial location, which may be a preselected fastener 52 and dielectric top 50. The high resolution camera 44 may be actuated and utilized at this time for proper location of the carriage 12 relative to progressing to and centering over the fastener 52 and dielectric top 50. In embodiments, the carriage 12 simply may include a sensor (e.g., sensor 54) configured to follow the copper grid 60 to the appropriate initial location.

The dielectric top 50 may be visually inspected through the high resolution camera 44 at this time. Alternately, or in addition, the crack detection sensor 48 may be actuated by the computer control 14. The crack detection sensor 48 may utilize one or more of the aforementioned crack detection methods to determine whether a crack exists in the dielectric top 50. If a crack is detected and exceeds a predetermined minimal length, such as 0.1 inches, the computer control 14, or a human operator at the computer control, may actuate the crack depth measurement sensor 54. Alternately, the crack depth measurement sensor 54 may be on a second carriage 12 that follows a first carriage. The crack depth measurement sensor 54 may utilize one or more of the aforementioned methods for measuring the depth of the crack in the dielectric top 50.

If the depth of the crack exceeds a predetermined depth, a decision may be made to repair the crack or mark the crack for repair at a later time, or by a second, following carriage 12. If it is decided to mark the crack, a stability mount 58 may be actuated to fix the carriage 34 in place on the surface 26 relative to the crack in the dielectric top 50. A tool in the form of device 56 may be actuated by the computer control 14 to employ one or more of the aforementioned methods to mark the crack with a pen, apply a sticker using a dispenser, or utilize digital marking by recording the location of the cracked dielectric top 50 in a database at 46, or in a remote database.

Alternately, or in addition, the device 56 may be actuated to repair the crack. This may involve actuating a dielectric material remover utilizing one or more of the aforementioned methods, such as by a plastic router. The device 56 also may include a chemical auto wipe device that applies acetone or MEK with a green residue recovery system. The carriage 12 may be repositioned so that the camera 44 inspects the excavated fastener head cavity that has been cleaned, and the cavity shown on display 30 to be viewed by a user. It may be necessary at this time to verify that all material has been removed from the cavity previously filled by the now-removed dielectric material, and that the surface of the fastener and the surface of the aircraft wing 26 is clean.

The device 56 may be actuated to reapply dielectric material, repaint over the applied dielectric material, or in the alternative apply an appliqué over the dielectric material instead of paint. After this replacement process has been completed, the high-resolution camera 44 may transmit an image of the completed repair to the display 30 so that a human operator may determine whether the quality of the repair is acceptable. In embodiments, the carriage 12 may include one or more sensors 48 to inspect the repair, as by using IRT to detect internal voids, and/or microwave or ultrasonic thickness gauges to determine whether the thickness of the paint is sufficient. After repairing the dielectric top 50, the computer control 14 may actuate the carriage 12 to move to a next successive dielectric top 50 location on the aircraft wing surface. This process may be repeated for each of the dielectric tops on the surface 26 of an aircraft wing 28. In embodiments, the carriage 34 may include an inspection device 56 that uses a capacitance check to verify electromagnetic event ("EME") protection.

The foregoing system 10 and method provides a consistent, repeatable and accurate inspection method that identifies cracks in dielectric tops on a surface before they become an issue. The method is extremely valuable from a cost, as well as a safety standpoint. Further, the disclosed method and system extends the time required between inspections relative to a method that is limited to detecting larger cracks, such as a simple visual method that relies on human eyes alone. A more significant cost avoidance may be provided by the described system and method as a result of the automation and speed of inspection. The crawling carriage 12 may reduce significantly the man hours and manpower required to perform a dielectric top inspection over the surface 26 of an aircraft wing 28 that may include thousands of dielectric tops 50.

While the forms of apparatus and methods disclosed herein constitute preferred embodiments of the invention, it is to be understood that variations may be made therein without departing from the scope of the invention.

What is claimed is:

1. A system for automated inspection of a surface, the system comprising:
    a self-propelled, steerable carriage capable of traversing the surface, the carriage having a camera positioned to view an object on the surface, a tool mounted on the carriage for treating a defect in the surface, and a sensor mounted on the carriage, the sensor selected from a sensor that detects the defect and a sensor that inspects a repair of the defect;
    wherein the tool is selected from a device that marks cracked dielectric tops for subsequent repair or removal, and a device that repairs or removes dielectric tops; and
    a computer controller connected to receive image data from the camera, communicate with and selectively actuate the tool for treating the defect, the at least one of the sensor capable of detecting the defect in the surface and the sensor for inspecting a repair of the defect, and control the carriage to move on the surface along one or both of a pre-set path and a path to one or more pre-set locations.

2. The system of claim 1, wherein the computer controller includes a database selected from the pre-set path, the path to the one or more pre-set locations, and a location of the defect in the surface; and the computer controller controls the carriage to move on the surface along a selected one of the pre-set path and the path to the one or more pre-set locations.

3. The system of claim 2, wherein the surface is a wing surface of an aircraft, and the one or more pre-set locations include one or more locations of tops made of dielectric material covering fasteners in the wing surface.

4. The system of claim 1, wherein the tool is selected from a rotating, semi-rigid plastic router that removes the dielectric top from the surface, a pen marker, a sticker dispenser for marking the dielectric top for one of repair and removal, a dispenser of dielectric material, a dispenser of paint to cover dielectric material, and an appliqué dispenser that places an appliqué over the dielectric material.

5. The system of claim 1, wherein the sensor for inspecting the repair of the defect includes one or more of a thermal imaging camera that utilizes infra-red thermography (IRT) to detect internal voids, a sensor using a microwave thickness gauge to determine whether a thickness of paint applied to the defect is sufficient, a sensor using an ultrasonic thickness gauge to determine whether the thickness of the paint applied to the defect is sufficient, a high-resolution camera for optical imaging to verify full coverage of dielectric material applied to the defect, a magneto-optical imaging device used as a full-field imaging method of mesh surrounding the defect, and an eddy current array.

6. The system of claim 1, further comprising:
    at least a second self-propelled, steerable carriage capable of traversing the surface, the second carriage having a second camera positioned to view an object on the surface, and a second sensor selected from a second sensor that detects the defect in the surface, a second tool, mounted on the second carriage, for treating the defect, and a third sensor for inspecting a repair of the defect;
    wherein the computer controller is connected to receive image data from the second camera, communicate with and selectively actuate the second sensor capable of detecting a defect in the surface, the second tool for treating the defect and the second sensor for inspecting a repair of the defect, and control the second carriage to move on the surface along one or more of a pre-set path and a path to one or more pre-set locations, in one of movement independent of and coordinated with the first carriage.

7. The system of claim 1, further comprising a stability mount for fixing the carriage to the surface during operation of the tool, the stability mount communicating with the computer control for selective activation and deactivation thereby.

8. The system of claim 7, wherein the stability mount is a suction device.

9. The system of claim 1, wherein the sensor capable of detecting a defect in the surface is a crack depth sensor.

10. The system of claim 9, wherein the crack depth sensor is selected from a Fourier transform infrared (FTIR) generator, Raman spectroscopy utilizing a laser, ultraviolet fluorescence, laser fluorescence, and forced diffusion thermography to determine a depth of a crack in the surface.

11. The system of claim 1, wherein the tool is a dispenser selected from a dispenser that applies acetone and a dispenser that applies methyl ethyl ketone (MEK).

12. The system of claim 1, further comprising a tether rod connected to the carriage and configured to provide fall arrest in the event that the carriage falls from the surface.

13. The system of claim 12, further comprising a cable connecting at least one of the camera and the at least one of the sensor and the tool to the computer controller; and the cable being supported at least partly by the tether rod.

14. A system for automated inspection of a surface of an aircraft, the system comprising:
    a self-propelled, steerable carriage capable of traversing the wing surface, the carriage having a camera positioned to view an object on the wing surface, a tool mounted on the carriage for treating the defect in the surface, and a sensor mounted on the carriage, the sensor selected from a sensor that detects a defect in the wing surface and a sensor that inspects a repair of the defect;
    wherein the tool is selected from a device that marks cracked dielectric tops for subsequent repair or removal, and a device that repairs or removes dielectric tops; and
    a computer controller connected to receive image data from the camera, communicate with and selectively actuate the at least one of the sensor capable of detecting a defect in the wing surface, the tool for treating the defect, and the sensor for inspecting a repair of the defect, and control the carriage to move on the wing surface along one or both of a pre-set path and a path to one or more pre-set locations.

15. A method for automated inspection of a surface, the method comprising:
    placing a self-propelled, steerable carriage on the surface, the carriage having a camera positioned to view an object on the surface, a tool mounted on the carriage for treating a defect on the surface, and a sensor mounted on the carriage, the sensor selected from a sensor that detects the defect in the surface, and a sensor that inspects a repair of the defect;

receiving image data from the camera by a computer controller; and communicating with and selectively actuating the tool for treating the defect, wherein treating the defect by the tool is selected from marking cracked dielectric tops for subsequent repair or removal, and repairing or removing dielectric tops, the sensor capable of detecting a defect in the surface, and the sensor for inspecting a repair of the defect, and controlling the carriage to move on the surface along one or both of a pre-set path and a path to one or more pre-set locations by the computer controller.

16. The method of claim 15, wherein controlling the carriage to move on the surface to the one or more pre-set locations thereon includes one or more of accessing a table containing the one or more pre-set locations stored in a database, actuating the carriage to follow a metal foil grid on the surface interconnecting the one or more pre-set locations, and remotely steering the carriage on the surface using the camera.

17. The method of claim 15, wherein selectively actuating the tool for treating the defect and a selected one of the sensor capable of detecting a defect in the surface, and the sensor for inspecting a repair of the defect includes actuating a tool selected from a rotating, semi-rigid plastic router adapted to remove a dielectric top from the surface;

a pen marker and a sticker dispenser for marking a dielectric top for one of repair and removal;

a dispenser for at least one of dielectric material, paint to cover dielectric material, and an appliqué configured to be placed over the dielectric material;

a crack depth sensor selected from a Fourier transform infrared generator, Raman spectroscopy utilizing a laser, ultraviolet fluorescence, a laser for laser fluorescence, and forced diffusion thermography to determine a depth of a crack in the surface;

an applicator to apply at least one of acetone and methyl ethyl ketone (MEK) to prepare the surface for repair of the defect;

a thermal imaging camera that utilizes infra-red thermography (IRT) to detect internal voids;

a sensor using a microwave thickness gauge to determine whether a thickness of paint applied to the defect is sufficient;

a sensor using an ultrasonic thickness gauge to determine whether the thickness of the paint applied to the defect is sufficient;

a high-resolution camera for optical imaging to verify full coverage of dielectric material applied to the defect;

a magneto-optical imaging device used as a full-field imaging method of mesh surrounding the defect; and an eddy current array.

18. A system for automated inspection of a surface, the system comprising:

a self-propelled, steerable carriage capable of traversing the surface, the carriage having a camera positioned to view an object on the surface, and at least one of a sensor capable of detecting a defect-in the surface, a tool for treating the defect, and a sensor for inspecting a repair of the defect; and a computer controller connected to receive image data from the camera, communicate with and selectively actuate the at least one of the sensor capable of detecting a defect in the surface, the tool for treating the defect and the sensor for inspecting a repair of the defect, and control the carriage to move on the surface along one or both of a pre-set path and a path to one or more pre-set locations, wherein the computer controller includes a database selected from the pre-set path, the path to the one or more pre-set locations and a location of the defect in the surface; and the computer controller controls the carriage to move on the surface along a selected one of the pre-set path and the path to the one or more pre-set locations;

wherein the surface is a wing surface of an aircraft, and the one or more pre-set locations include one or more locations of tops made of dielectric material covering fasteners in the wing surface; and wherein the sensor capable of detecting a defect in the surface is selected from includes at least one of a crack depth sensor for finding a crack in the tops, wherein the crack depth sensor includes one of high-resolution optical imaging with alternating light emitting diode (LED) side-lighting, a dye penetrant drop-and-wipe device including an ultraviolet lamp and chromatic dye deposition, ultraviolet or infrared laser fluorescence, Raman spectroscopy; and a crack depth measurement sensor for measuring a depth of the crack, wherein the crack depth measurement sensor includes one of a terahertz measurement device for transmitting terahertz radiation to measure and/or image depth of a crack in the top, a narrow beam laser adapted to scan the crack, and a forced diffusion thermography device for measuring an amount of heat transferred from one side of the crack to the other, the forced diffusion thermography device including a localized heat source to be positioned on one side of the crack and a mini uncooled infrared camera for imaging, a high frequency ultrasound generator adapted to direct one of an angled pitch-catch across the crack and a structural wave across the crack, a fiber optic laser ultrasound generator, a capacitance measurement sensor for measuring capacitance across the crack, a near-field millimeter wave generator, a mini x-ray backscatter device, a Fourier transform infrared (FTIR) generator, Raman spectroscopy utilizing a laser, and a laser for laser fluorescence.

19. A system for automated inspection of a surface, the system comprising:

a self-propelled, steerable carriage capable of traversing the surface, the carriage having a camera positioned to view an object on the surface, and at least one of a sensor capable of detecting a defect in the surface, a tool for treating the defect, and a sensor for inspecting a repair of the defect; and a computer controller connected to receive image data from the camera, communicate with and selectively actuate the at least one of the sensor capable of detecting a defect in the surface, the tool for treating the defect and the sensor for inspecting a repair of the defect, and control the carriage to move on the surface along one or both of a pre-set path and a path to one or more pre-set locations; and wherein the sensor for inspecting the repair of the defect is selected from a thermal imaging camera that utilizes infra-red thermography (IRT) to detect internal voids, a sensor using a microwave thickness gauge to determine whether a thickness of paint applied to the defect is sufficient, a sensor using an ultrasonic thickness gauge to determine whether the thickness of the paint applied to the defect is sufficient, a high-resolution camera for optical imaging to verify full coverage of dielectric material applied to the defect, a magneto-optical imaging device used as a full-field imaging method of mesh surrounding the defect, and an eddy current array.

20. A system for automated inspection of a surface, the system comprising:
- a self-propelled, steerable carriage capable of traversing the surface, the carriage having a camera positioned to view an object on the surface, and at least one of a sensor capable of detecting a defect in the surface, a tool for treating the defect, and a sensor for inspecting a repair of the defect; and
- a computer controller connected to receive image data from the camera, communicate with and selectively actuate the at least one of the sensor capable of detecting a defect in the surface, the tool for treating the defect and the sensor for inspecting a repair of the defect, and control the carriage to move on the surface along one or both of a pre-set path and a path to one or more pre-set locations;
- wherein the sensor capable of detecting a defect in the surface is a crack depth sensor selected from a Fourier transform infrared (FTIR) generator, Raman spectroscopy utilizing a laser, ultraviolet fluorescence, a laser for laser fluorescence, and forced diffusion thermography to determine a depth of a crack in the surface.

21. A system for automated inspection of a surface, the system comprising:
- a self-propelled, steerable carriage capable of traversing the surface, the carriage having a camera positioned to view an object on the surface, and at least one of a sensor capable of detecting a defect in the surface, a tool for treating the defect, and a sensor for inspecting a repair of the defect; and
- a computer controller connected to receive image data from the camera, communicate with and selectively actuate the at least one of the sensor capable of detecting a defect in the surface, the tool for treating the defect and the sensor for inspecting a repair of the defect, and control the carriage to move on the surface along one or both of a pre-set path and a path to one or more pre-set locations;
- wherein the tool is a dispenser that performs preparation of the surface for repair of the defect, and is selected from a dispenser to apply acetone and a dispenser to apply methyl ethyl ketone (MEK).

22. A system for automated inspection of a surface, the system comprising:
- a self-propelled, steerable carriage capable of traversing the surface, the carriage having a camera mounted thereon and positioned to view an object on the surface, and a tool mounted on the carriage for treating a defect in the surface;
- wherein that tool is selected from a device that marks cracked dielectric tops for subsequent repair and removal, and a device that repairs or removes the dielectric tops; and
- a computer controller connected to receive image data from the camera, communicate with and selectively actuate the tool for treating the defect, and control the carriage to move on the surface along one or both of a pre-set path and a path to one or more pre-set locations.

* * * * *